US012773656B2

(12) United States Patent
Schmid

(10) Patent No.: US 12,773,656 B2
(45) Date of Patent: Oct. 27, 2026

(54) FLAT-FILTER FILTER ELEMENT WITH AT LEAST TWO FILTER MEDIUM BODIES, FILTER SYSTEM AND USE OF FLAT-FILTER FILTER ELEMENT

(71) Applicant: MANN+HUMMEL GmbH, Ludwigsburg (DE)

(72) Inventor: Daniel Schmid, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 305 days.

(21) Appl. No.: 18/731,917

(22) Filed: Jun. 3, 2024

(65) Prior Publication Data

US 2024/0408527 A1 Dec. 12, 2024

(30) Foreign Application Priority Data

Jun. 6, 2023 (EP) .................................... 23177477

(51) Int. Cl.
*B01D 46/12* (2022.01)
*B01D 46/00* (2022.01)
(Continued)

(52) U.S. Cl.
CPC ......... *B01D 46/10* (2013.01); *B01D 46/0036* (2013.01); *B01D 46/521* (2013.01); *B01D 2201/34* (2013.01)

(58) Field of Classification Search
CPC .... B01D 46/10; B01D 46/0036; B01D 46/00; B01D 46/521; B01D 2201/34;
(Continued)

(56) References Cited

U.S. PATENT DOCUMENTS 4,340,402 A * 7/1982 Catron .................. B01D 46/10 55/501
6,361,577 B1 3/2002 Unrath et al.
(Continued)

FOREIGN PATENT DOCUMENTS

CN 212309146 U * 1/2021
DE 102015011339 A1 3/2016
(Continued)

OTHER PUBLICATIONS

EPO Search Report in corresponding EPO Appln. No. 23177477.9, Sep. 27, 2023, Munich, Germany.
(Continued)

*Primary Examiner* — Frank M Lawrence, Jr.

(57) ABSTRACT

The invention relates to a flat-filter filter element for filtering, e.g., air, for a filter system, e.g., of a fuel cell system, having an arrangement of at least two flat-filter medium bodies being arranged adjacent to each other in an axial direction so that the fluid can flow through them one after the other in the axial direction. The filter medium bodies each comprise a lateral band at their outer circumference. The lateral band of one of the filter medium bodies protrudes in axial direction over the other one of the filter medium bodies and at least partly overlaps the lateral band of the other of the filter medium bodies in an overlapping region, the lateral bands in the overlapping region being at least partially embedded in a circumferential cast element arranged at a downstream side of the arrangement of filter medium bodies.

15 Claims, 6 Drawing Sheets

(51) Int. Cl.
*B01D 46/10* (2006.01)
*B01D 46/52* (2006.01)
*B01D 46/64* (2022.01)

(58) Field of Classification Search
CPC ....................... B01D 46/0002; B01D 46/0005; B01D 46/64; B01D 46/12; B01D 46/62; B01D 46/525; B01D 46/56; B01D 53/04; B01D 2253/102; Y02E 60/50; H01M 8/04089
USPC ..... 55/490, 495, 497, 499, 502, 511; 96/134
See application file for complete search history.

(56) References Cited

U.S. PATENT DOCUMENTS

| | | | | |
|---|---|---|---|---|
| 2010/0024642 | A1 | 2/2010 | Fukumoto et al. | |
| 2010/0304232 | A1 | 12/2010 | Huecker et al. | |
| 2012/0260616 | A1 | 10/2012 | Leister et al. | |
| 2015/0273985 | A1 | 10/2015 | Luley et al. | |
| 2017/0320001 | A1 | 11/2017 | Stinzendoerfer et al. | |
| 2021/0276401 | A1 | 9/2021 | Stiehler et al. | |
| 2023/0381703 | A1* | 11/2023 | Siegele .............. | B01D 46/0005 |
| 2024/0408526 | A1* | 12/2024 | Schmid .............. | B01D 46/0036 |
| 2025/0001343 | A1* | 1/2025 | Haynl ................ | B01D 46/0036 |

FOREIGN PATENT DOCUMENTS

| | | | |
|---|---|---|---|
| EP | 3520878 | A1 | 8/2019 |
| JP | H0445515 | U1 | 4/1992 |
| WO | 2015092681 | A1 | 6/2015 |

OTHER PUBLICATIONS

Office Action in corresponding German Appln. No. 102023114807.9, Jan. 24, 2024, 5 pages, Germany.

* cited by examiner

FLAT-FILTER FILTER ELEMENT WITH AT LEAST TWO FILTER MEDIUM BODIES, FILTER SYSTEM AND USE OF FLAT-FILTER FILTER ELEMENT

CROSS-REFERENCE TO RELATED APPLICATION

This application claims the benefit under 35 U.S.C. 119(a) of European Application No. 23177477.9 filed on Jun. 6, 2023, in the European Patent Office, the entire disclosure of which is incorporated herein by reference for all purposes.

TECHNICAL FIELD

The invention relates to a flat-filter filter element for filtering a fluid, in particular for filtering air, for a filter system, in particular for an air filter system of a fuel cell system, as well as to a filter system for filtering a fluid, in particular for filtering air, in particular of a fuel cell system and a use of a flat-filter filter element.

BACKGROUND

Fuel cell systems often require a particle filter and an adsorption filter to filter both particles and harmful gases from the intake air. The filter elements are often designed as flat filters, for example, but other filter element shapes also occur.

DE 10 2011 017 444 A1 discloses an exchangeable filter module for flanging onto a wall of a housing that accommodates a fuel cell. The spin-on filter module comprises a filter element with a filter medium. The filter element has a seal which interacts with the housing in the manner of a key-lock connection.

WO 2015/092681 discloses a multi-layered filter element wherein the layers of filtering material making up the filter element are undetachably held together in the filter material, by sealing gaskets of plastic material in which the paper of the layers is partially incorporated. These gaskets perform both the function of preventing air that enters the grooves of the layers from exiting laterally parallel to the ridges and grooves and the function of obtaining a tight seal between the filter element and the walls of the housing receiving the filter element. The gaskets are arranged on the faces of the filter element body that are perpendicular to the bending lines of the paper. In the case of filter elements with prismatic shapes the gaskets are arranged on the opposite flanks perpendicular to the bending lines of the paper.

EP 3 520 878 B1 discloses a filter element for filtering interior compartment air, having at least three filter layers, wherein the filter layers are arranged in a frame, and the frame is assembled from extruded profiled strips. The first filter layer is formed as a pre-filter, the second filter layer is formed as a fine filter and the third filter layer is formed as an adsorption filter. In the frame a region is provided for each filter layer. Each profiled strip has between the second filter layer and the third filter layer a projecting shoulder for separating the second filter layer from the third filter layer in the region of the frame.

US 2015273985 A1 discloses a cabin air filter element for a cabin air filter for the driver's cabin of agricultural and work machines. The cabin air filter element comprises a filter element frame, a prefilter layer, an adsorption filter layer, a fine filter layer, in particular for separation of aerosols. The filter layers substantially are flowed through along a flow direction. The filter element frame comprises two areas. In the first area of the filter element frame, a first effective cross-sectional area with regard to flow through of the taken-in air through the filter layers is provided. In the second area, a corresponding second effective cross-sectional area is provided. Moreover, a circumferentially extending gasket is provided. The circumferentially extending gasket serves for separation of the raw side of the cabin air filter element from the clean side when the cabin air filter element is installed in the filter housing of the cabin air filter. The first area is preferably arranged geometrically upstream relative to the gasket, the second area is preferably arranged geometrically downstream relative to the gasket. The second effective cross-sectional area amounts to only a fraction of the first effective cross-sectional area. The filter layers are fixed to the filter element frame by gluing points.

US 2021276401 A1 discloses a vehicle cabin filter assembly comprising a filter module and a further filter module positioned downstream of the filter module. Each filter module comprises one or more filter elements. The filter elements of the filter module are pleated at a first pleat pitch and comprise a gas filter element. The filter elements of the further filter module are pleated at a second pleat pitch and comprise a particulate filter element. The second pleat pitch is smaller than the first pleat pitch. The filter elements of a filter module are each arranged in a frame. The frame is sealed with a gasket against a module housing in which the filter module is arranged. When installed in a filter housing, the module housing is sealed against the filter housing with a gasket on the end face.

SUMMARY

It is an object of the invention to provide a service-friendly and cost-effective flat-filter filter element for filtering a fluid, in particular for filtering air, for a filter system, in particular for an air filter system of a fuel cell system.

Another object is to provide a filter system for filtering a fluid, in particular for filtering air, in particular of a fuel cell system with such a service-friendly and cost-effective flat-filter filter element.

Another object is to provide a use of such a flat-filter filter element in a filter system, for filtering a fluid, in particular for filtering air, in particular for an air filter system of fuel cell system.

According to an aspect of the invention the object is achieved by a flat-filter filter element for filtering a fluid, in particular for filtering air, for a filter system, in particular for an air filter system of a fuel cell system, having an arrangement of at least two flat filter medium bodies being arranged adjacent to each other in an axial direction, so that the fluid can flow through them one after the other in the axial direction, wherein the filter medium bodies each comprise a lateral band at their outer circumference, wherein the lateral band of one of the filter medium bodies protrudes in axial direction over the other one of the filter medium bodies and at least partly overlaps the lateral band of the other of the filter medium bodies in an overlapping region, wherein a common circumferential cast element is arranged at a downstream side of the arrangement of the filter medium bodies, wherein the lateral bands of the arrangement of filter medium bodies are at least partly embedded in the circumferential cast element in the overlapping region.

According to an aspect of the invention the further object is achieved by a filter system for filtering a fluid, in particular for filtering air, in particular of a fuel cell system, having a filter housing with a fluid inlet and a fluid outlet, and having at least one flat-filter filter element, the filter element being arranged between the fluid inlet and the fluid outlet, wherein a sealing surface of a first housing part of the filter housing abuts a downstream cast element of the flat-filter filter element arranged at the downstream filter medium body, and wherein a housing wall of a second housing part of the filter housing is sealingly pressed against the cast element on an opposite side of the sealing surface.

According to an aspect of the invention the further object is achieved by a use of a flat-filter filter element in a filter system, for filtering a fluid, in particular for filtering air, in particular for an air filter system of a fuel cell system.

Advantageous embodiments are described in the dependent claims, the description and the drawings.

According to an aspect of the invention a flat-filter filter element for filtering a fluid, in particular for filtering air, for a filter system, in particular for an air filter system of a fuel cell system, is proposed, having an arrangement of at least two flat filter medium bodies being arranged adjacent to each other in an axial direction, so that the fluid can flow through them one after the other in the axial direction. The filter medium bodies each comprise a lateral band at their outer circumference, wherein the lateral band of one of the filter medium bodies protrudes in axial direction over the filter medium body and at least partly overlaps the lateral band of the other of the filter medium bodies in an overlapping region. A common circumferential cast element is arranged at a downstream side of the arrangement of the filter medium bodies, wherein the lateral bands of the arrangement of filter medium bodies are at least partly embedded in the circumferential cast element.

The proposed filter element can advantageously be used for the intake air of fuel cell systems. An adsorption of harmful gases and particle filtration can advantageously take place in different filter medium bodies. The two filter medium bodies are connected to each other via at least partly overlapping lateral bands. The lateral bands are at least partly embedded in the circumferential cast element. In particular, the cast element may be configured as a circumferential sealing element. The overlapping region may be limited up to a certain axial extension along the side of the filter element, sufficient for the lateral bands to be glued together, e.g., by means of a hot melt adhesive. The lateral band can, for example, be formed from a nonwoven material, in particular a filter nonwoven, filter fabric or filter scrim. The nonwoven material of the lateral band can in particular have a lower air permeability than a filter medium of the filter medium body and/or a higher flexural rigidity than a filter medium of the filter medium body.

In another embodiment, the overlapping region may also cover the axial extension of one of the filter medium bodies in order to enhance a stiffness of the connection of the two filter medium bodies.

In a further embodiment, only one lateral band may be used for connecting both filter medium bodies, wherein the lateral band may be glued to both filter medium bodies in a single process or to one filter medium body after the other filter medium body.

By such an arrangement the filter medium bodies are securely connected to each other as well as tightly sealed against side flows of the fluid.

Thus, both filter medium bodies are enclosed on their circumferential sides by the lateral bands forming a favorable protection and sealing for the filter media. Additionally, the filter element with the two filter medium bodies is provided in a stable arrangement even for larger filter elements. The tightly connected lateral bands provides additional stability, particularly for larger filter elements.

The lateral bands can, for example, be formed from a nonwoven material, in particular a nonwoven filter, filter fabric or filter scrim. The nonwoven material of the lateral band can in particular have a lower air permeability than a filter medium of the filter medium body and/or a higher flexural rigidity than a filter medium of the filter medium body.

In the proposed flat-filter filter element, both filter medium bodies for the two filtration stages are arranged one behind the other in the form of flat-filter medium bodies in the direction of flow of the fluid.

The filter medium body arranged upstream is closer to the upstream side of the filter element than the filter medium body arranged downstream which is arranged closer to the downstream side of the filter element.

The two filter medium bodies can be in the form of folded bellows, coiled bodies, fill (especially for adsorption of harmful gases), coated honeycomb bodies (especially for adsorption of harmful gases), or combinations thereof. The height of the filter medium bodies in the axial direction can be designed differently. The flow through the filter element is such that the filter medium body, which is designed as a particle filter, is always flowed through first. The filter element can be sealed against the filter housing advantageously in the axial direction.

In this way, particles as well as harmful gases can be filtered out of the intake air, for example in fuel cell systems.

The available installation space can thus be utilized in a better way. This results in advantages in terms of adsorption capacity, dust capacity, separation efficiency and pressure drop of the filter element.

The lateral bands provide a cost-efficient way of connecting the filter medium bodies.

According to a favorable embodiment of the filter element, the lateral bands may be tightly connected to each other in the overlapping region. Preferably the lateral bands may be glued together in the overlapping region.

The cast element can be produced by means of a plastic casting process or plastic foaming process, for example from the casting material polyurethane (PUR), in a suitable casting mold. The casting material can be in the form of rigid foam or flexible foam.

The downstream cast element, which is formed as a sealing element, can be designed in such a way that a counterforce of the housing parts provides the seal. The cast element can then be pressed between the housing parts.

Advantageously only one casting process is needed to produce the circumferential cast element. A stable connection between the cast element and the downstream filter medium body may be established as the filter medium body at least partly is embedded in the casting material, at least with a downstream outermost edge.

According to a favorable embodiment of the filter element, a stiffening element, in particular by a stiffening grid, may be arranged at the filter medium body arranged outermost downstream in the arrangement of the filter medium bodies at least on its downstream outer edge wherein a circumference of the stiffening element may be embedded in the cast element. Favorably, the stiffening element can help to stiffen the entire filter element, especially in the case of very large filter elements with a large surface area. In addition, the two filter medium bodies can be supported against the flow pressure of the fluid to be filtered. For fixing the stiffening element to the filter medium body, the stiffening element may be connected to the cast element. In particular, the stiffening element may at least partly be embedded in the cast element.

According to a favorable embodiment of the filter element, one or more bolting tabs may be connected to the circumference of the stiffening element. Thus, the stiffening element, which is tightly connected to at least one of the filter medium bodies, e.g., by embedding in the cast element, may serve for fixing the filter element to the filter housing, e.g., by bolting tabs and screws.

According to a favorable embodiment of the filter element, the filter medium body arranged outermost downstream in the arrangement of the filter medium bodies may be connected to the circumferential cast element at its downstream outer edge. By this arrangement the downstream filter medium body is securely connected to the cast element. This allows a fixed connection to the cast element, which can also be designed as a sealing element for sealing in the filter housing.

According to a favorable embodiment of the filter element, the outermost downstream filter medium body may comprise an additional filter layer arranged on its downstream side. Favorably, this can prevent adsorption particles from being discharged from the downstream filter medium body by the fluid flow. Preferred designs for the additional filter layer are filter media based on cellulose and/or synthetic fibers, in particular nonwoven materials, and/or filter membranes.

According to a favorable embodiment of the filter element, the outermost upstream filter medium body may be designed as a particle filter. Additionally or alternatively, the outermost downstream filter medium body may be designed as an adsorption filter.

In particular, the outermost upstream filter medium body may be made of cellulose. The outermost downstream filter medium body may be designed as an activated carbon filter and/or as an ion exchanger.

According to a favorable embodiment of the filter element, the downstream cast element may be designed as a circumferential sealing element for sealing, in particular in the axial direction, between a raw side and a clean side when the filter element is installed in a filter housing of the filter system as intended. In particular, the downstream cast element may be arranged radially outside the at least two filter medium bodies and may be configured for sealing between a first housing part and a second housing part of the filter housing of the filter system. In this way, the downstream cast element can fulfill several functions and be designed both for connecting the downstream filter medium body to the stiffening element and for sealing the filter element to the filter housing. By being arranged outside the two filter medium bodies, the cast element can be effectively pressed between the two housing parts and thus ensure both the seal between the raw side and clean side of the filter system and the seal to the environment.

According to a favorable embodiment of the filter element, at least one of the two filter medium bodies may be formed as a folded filter bellows. In particular, particle filters are favorably manufactured from cellulose and formed as folded filter bellows with pleats.

According to a favorable embodiment of the filter element, end edges of pleats of at least one of the two filter medium bodies may be sealed with an end edge bonding. End edges of pleats of at least one of the two filter medium bodies may be sealed with an end edge bonding. The end edge bonding may be at least partially embedded into the downstream and/or upstream cast element. The end edge bonding may be arranged using hot melt adhesive, for example. The end edge bonding seals the filter medium body at the side walls, which is particularly favorable in the case of filter medium bodies designed in the form of pleated filter bellows or as fill. Integration into the cast element enables reliable sealing of the filter medium body along the flow path.

According to a further aspect of the invention a filter system for filtering a fluid, in particular for filtering air, in particular of a fuel cell system, is proposed, having a filter housing with a fluid inlet and a fluid outlet, and having at least one flat-filter filter element, the filter element being arranged between the fluid inlet and the fluid outlet. A sealing surface of a first housing part of the filter housing abuts a downstream cast element of the flat-filter filter element arranged at the downstream filter medium body, and a housing wall of a second housing part of the filter housing is sealingly pressed against the cast element on an opposite side of the sealing surface.

The proposed filter system can advantageously be used for the intake air of fuel cell systems. The adsorption and particle filtration can advantageously take place in different filter medium bodies. The two filter medium bodies are connected to each other via at least partly overlapping lateral bands. The lateral bands are at least partly embedded in the circumferential cast element. In particular, the cast element may be configured as a circumferential sealing element. The overlapping region may be limited up to a certain axial extension along the side of the filter element, sufficient for the lateral bands to be glued together, e.g., by means of a hot melt adhesive.

In another embodiment, the overlapping region may also cover the axial extension of one of the filter medium bodies in order to enhance a stiffness of the connection of the two filter medium bodies.

In a further embodiment, only one lateral band may be used for connecting both filter medium bodies, wherein the lateral band may be glued to both filter medium bodies in a single process or to one filter medium body after the other filter medium body.

By such an arrangement the filter medium bodies are securely connected to each other as well as tightly sealed against side flows of the fluid. The lateral bands provide a cost-efficient way of connecting the filter medium bodies.

Thus, both filter medium bodies are enclosed on their circumferential sides by the lateral bands forming a favorable protection and sealing for the filter media. Additionally, the filter element with the two filter medium bodies is provided in a stable arrangement even for larger filter elements. The tightly connected lateral bands provides additional stability, particularly for larger filter elements.

In the proposed filter system, both filter medium bodies of the filter system for the two filtration stages are arranged one behind the other in the form of flat-filter medium bodies in the direction of flow of the fluid.

The two filter medium bodies can be in the form of folded bellows, coiled bodies, fill (especially for adsorption of harmful gases), coated honeycomb bodies (especially for adsorption of harmful gases), or combinations thereof. The height of the filter medium bodies in the axial direction can be designed differently. The flow through the filter element is such that the filter medium body, which is designed as a particle filter, is always flowed through first. The filter element can be sealed against the filter housing advantageously in the axial direction.

With the proposed filter system, particles as well as harmful gases can be filtered out of the intake air, for example in fuel cell systems.

The available installation space can thus be utilized in a better way. This results in advantages in terms of adsorption capacity, dust capacity, separation efficiency and pressure drop of the filter element.

According to a favorable embodiment of the filter system, a stiffening element, in particular by a stiffening grid, may be arranged at the filter medium body arranged outermost downstream in the arrangement of the filter medium bodies at least on its downstream outer edge wherein a circumference of the stiffening element may be embedded in the cast element. The stiffening element with the cast element may be pressed between the sealing surface and the end of the housing wall. Favorably, the stiffening element can help to stiffen the entire filter element, especially in the case of very large filter elements with a large surface area. In addition, the two filter medium bodies can be supported against the flow pressure of the fluid to be filtered. For fixing the stiffening element to the filter medium body, the stiffening element may be connected to the cast element. In particular, the stiffening element may at least partly be embedded in the cast element.

According to a favorable embodiment of the filter system, one or more bolting tabs may be connected to the circumference of the stiffening element. Thus, the stiffening element, which is tightly connected to at least one of the filter medium bodies, e.g., by embedding in the cast element, may serve for fixing the filter element to the filter housing, e.g., by bolting tabs and screws.

According to a further aspect of the invention a use of a flat-filter filter element in a filter system for filtering a fluid, in particular for filtering air, in particular for an air filter system of a fuel cell system is proposed.

Advantageously, the filter element can be designed as a particle filter and/or as an adsorption filter, in particular as an activated carbon filter and/or as an ion exchanger. Advantageously, particles as well as harmful gases can be filtered out of the intake air, for example in fuel cell systems.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION

Figure 1:
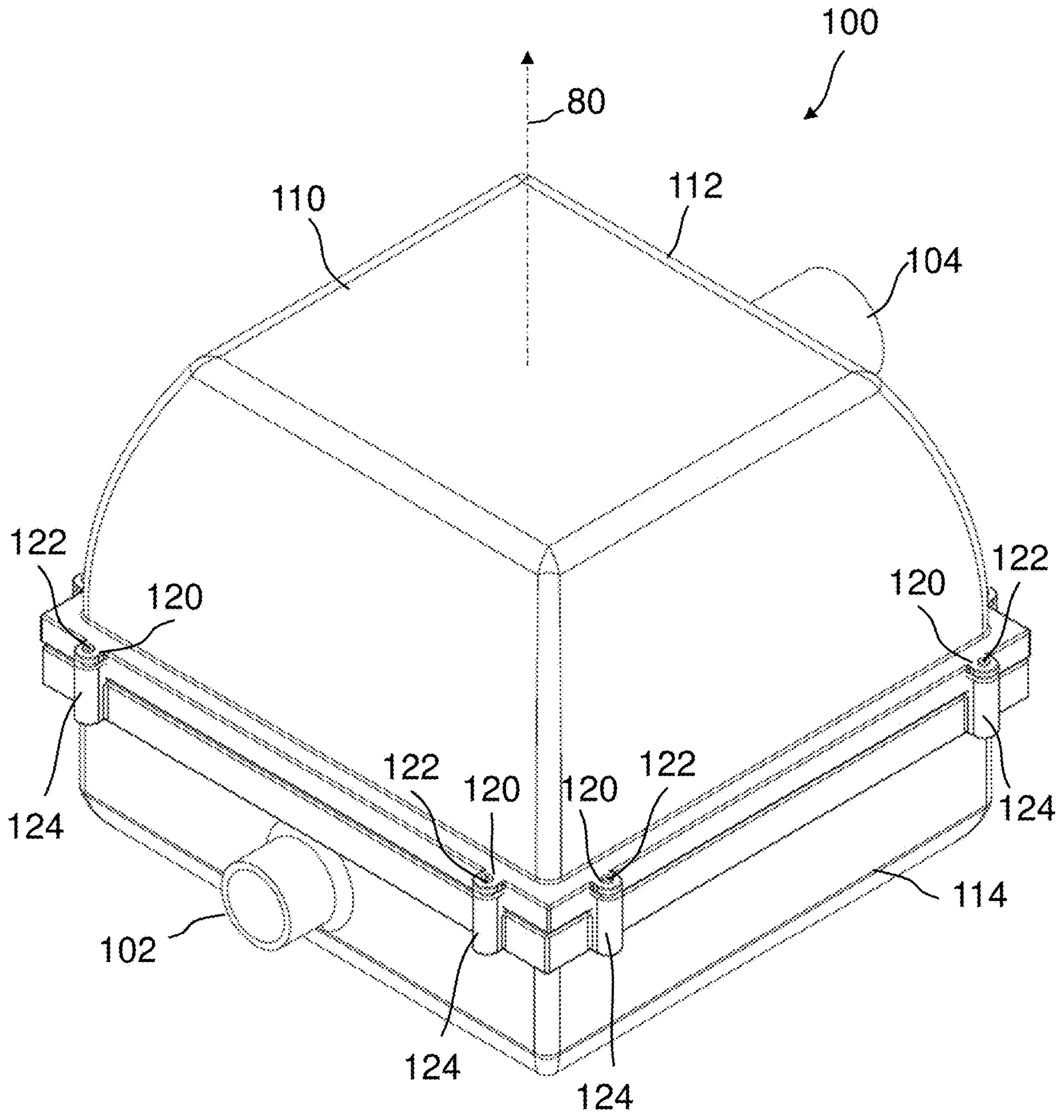
FIG. 1 an isometric view of a filter system for filtering a fluid, in particular for filtering air, in particular of a fuel cell system, according to an embodiment of the invention.

Referring to the figures generally, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
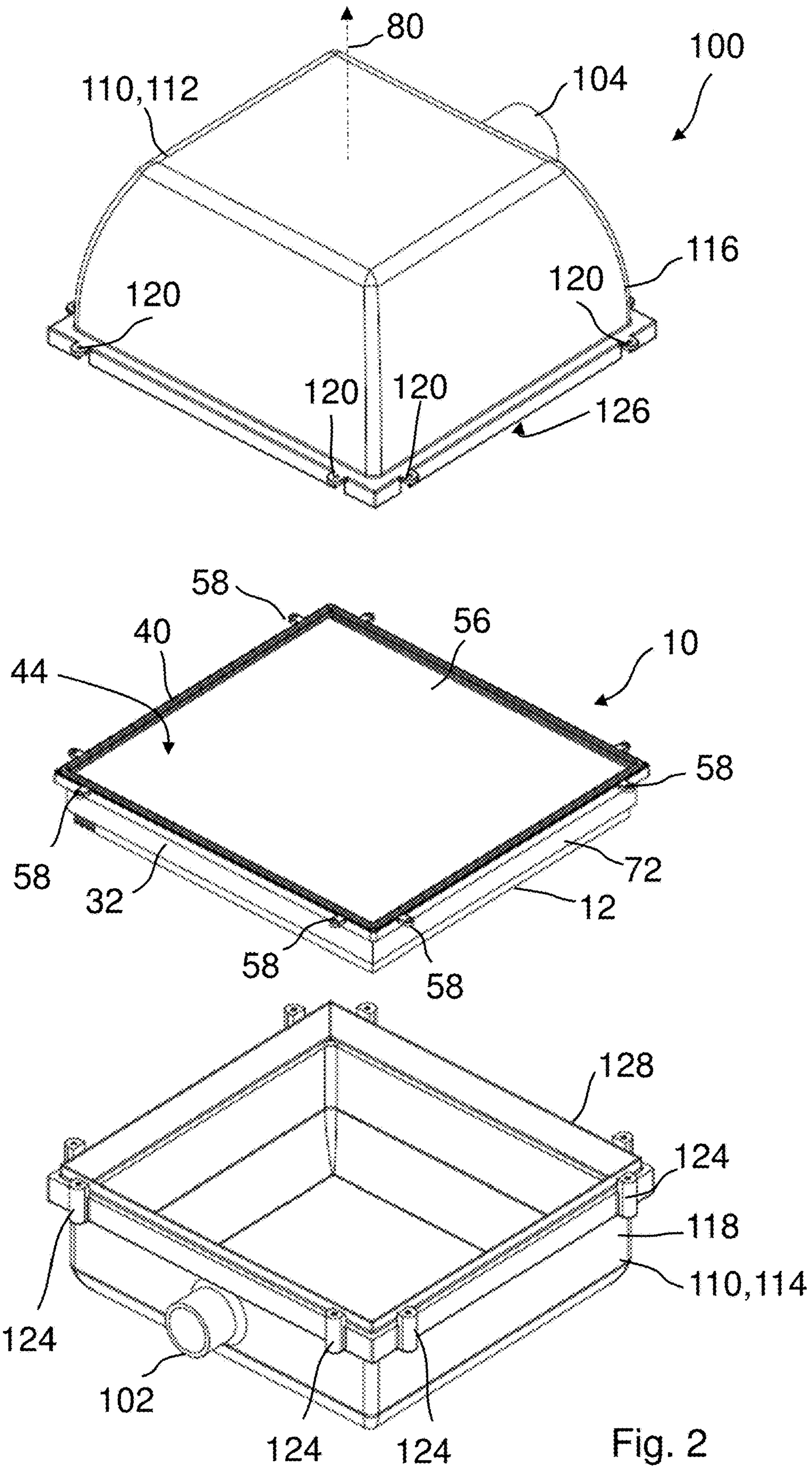
FIG. 2 an isometric exploded view of the filter system according to FIG. 1.
Figure 3:
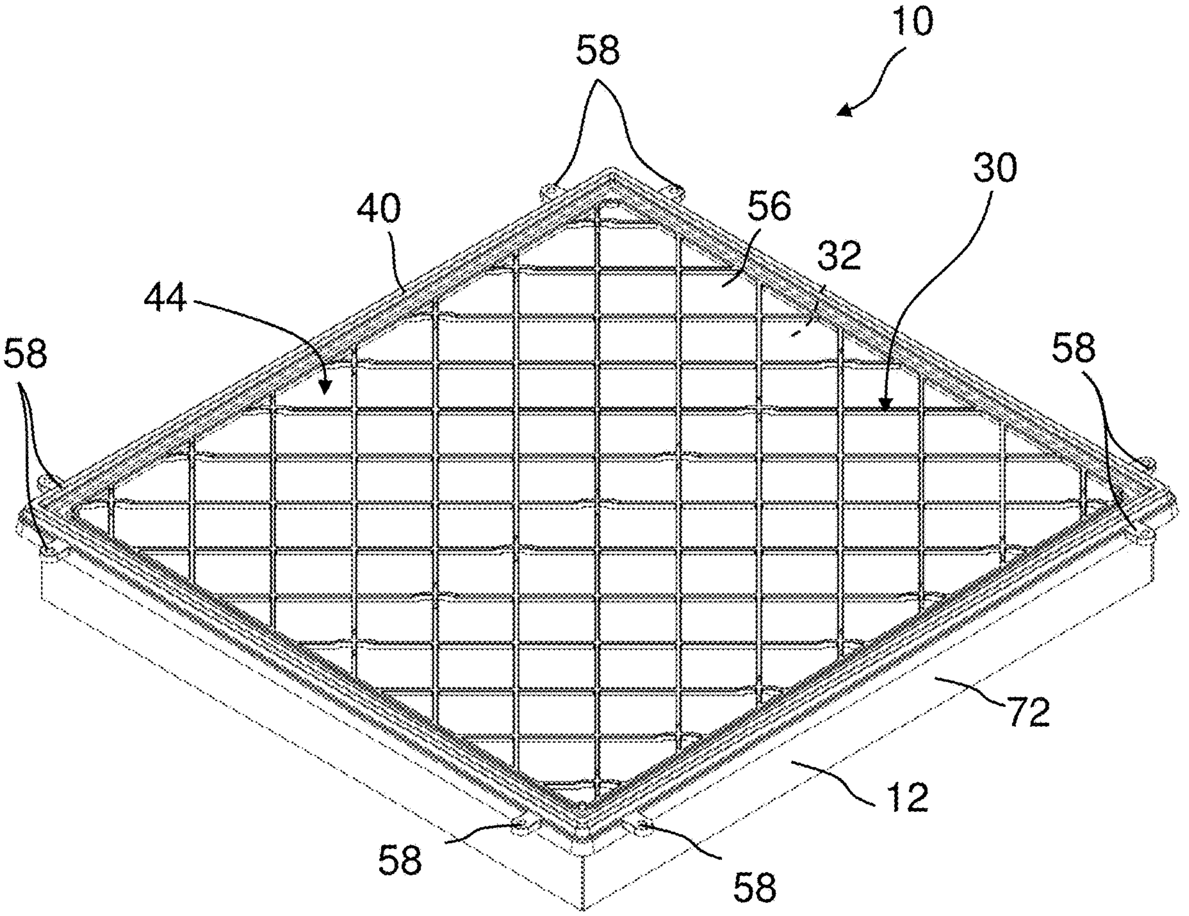
FIG. 3 an isometric view of a filter element according to a further embodiment of the invention.

FIG. 1 depicts an isometric view of a filter system 100 for filtering a fluid, in particular for filtering air, in particular of a fuel cell system, according to an embodiment of the invention. FIG. 2 depicts an isometric exploded view of the filter system 100. FIG. 3 shows an isometric view of a filter element 10 according to an embodiment of the invention.

The filter system 100 has a filter housing 110 with a fluid inlet 102 and a fluid outlet 104, and has at least one flat-filter filter element 10, which is arranged between the fluid inlet 102 and the fluid outlet 104. The fluid inlet 102 is positioned in a second housing part 114 and the fluid outlet 104 is positioned in a first housing part 112.

A sealing surface 126 of the first housing part 112 abuts a downstream cast element 40 arranged at a downstream filter medium body 32, and a housing wall 118 of the second housing part 114 is sealingly pressed against the cast element 40 on an opposite side of the sealing surface 126.

Figure 5:
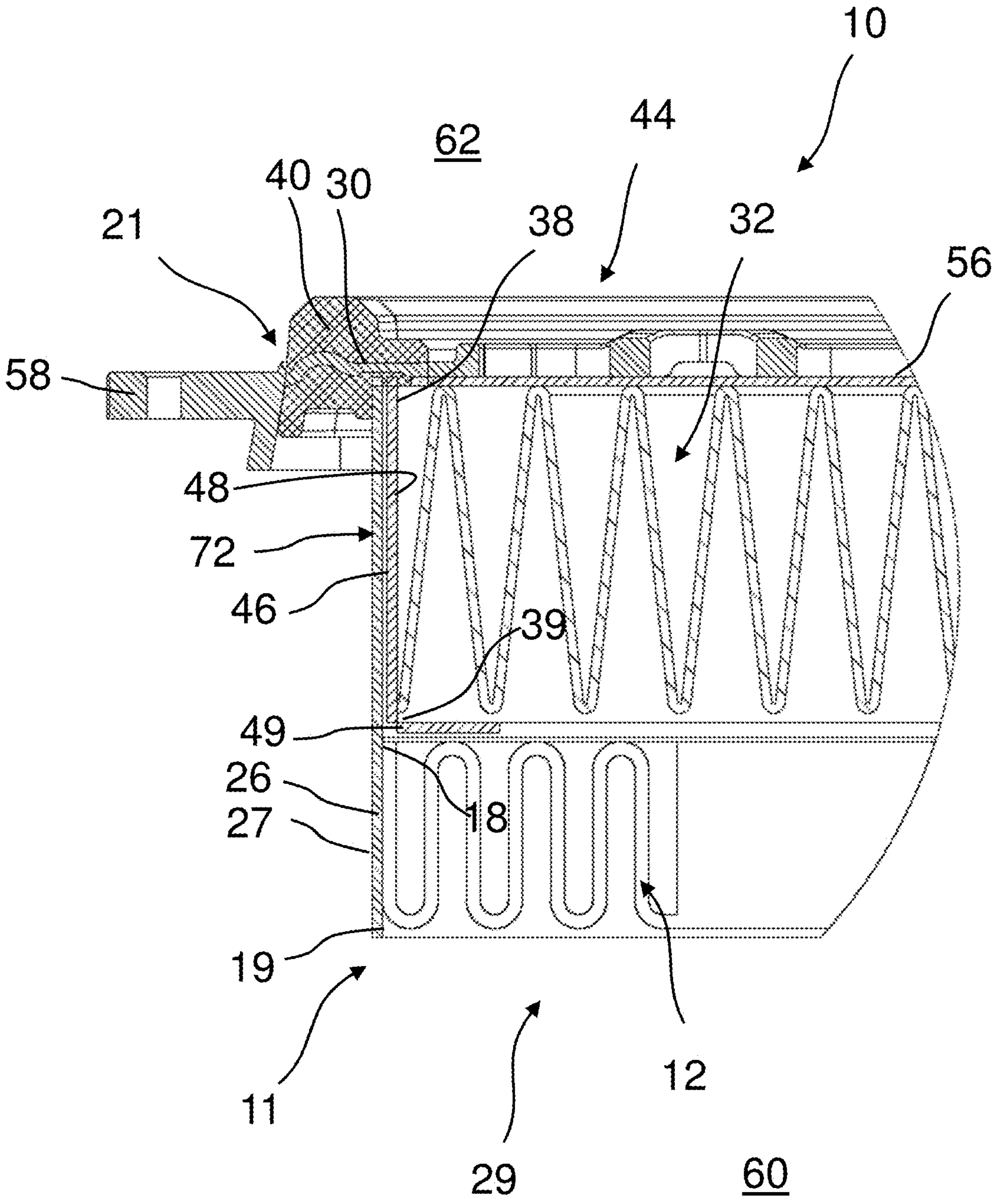
FIG. 5 the enlarged section V according to FIG. 4.

When the filter element 10 is arranged as intended in the second housing part 114 and the filter housing 110 is closed via the first housing part 112, the cast element 40 seals the interior of the filter housing 110 from the environment. At the same time, the cast element 40 seals a raw side 60 inside the filter housing 110 against a clean side 62 (FIG. 5).

The downstream side 44 of the filter element 10 is directed towards the first housing part 112 in the direction of the fluid inlet 102.

When the filter element 10 is inserted, bolting tabs 58 of the filter element 10 are arranged between screw domes 124 and bolting tabs 120 of the housing wall 116 of the first housing part 112 and screwed together by means of screws 122, as can be seen in FIG. 1.

As shown in FIG. 3, the filter medium body 32 arranged outermost downstream in the arrangement of the filter medium bodies 12, 32 may be covered by a stiffening element 30, in particular by a stiffening grid, wherein a circumference of the stiffening element 30 is embedded in the cast element 40. The one or more bolting tabs 58 may favorably be connected to the circumference of the stiffening element 30.

The embodiment of the filter element 10 shown in FIG. 2 is without a stiffening element 30. Here the bolting tabs 58 may be integrated in a frame on the circumference of the filter element 10.

Figure 4:
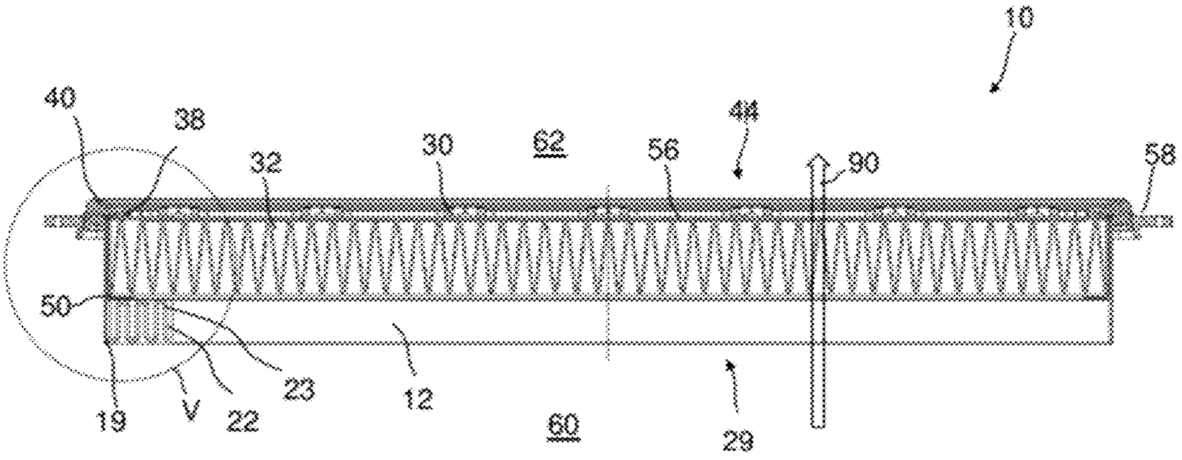
FIG. 4 a longitudinal cut view of the filter element according to FIG. 3 with a marked section V.

FIG. 4 depicts a longitudinal cut view of the filter element 10 according to FIG. 3 with a marked section V. FIG. 5 shows the enlarged section V according to FIG. 4.

The flat-filter filter element 10 has an arrangement of at least two flat filter medium bodies 12, 32 being arranged adjacent to each other in an axial direction 80, so that the fluid can flow through them one after the other in the axial direction 80. The filter medium bodies 32, 12 each comprise a lateral band 27, 48 at their outer circumference 26, 46. The lateral band 27 of one of the filter medium bodies 12 protrudes in axial direction 80 over the filter medium body 32 and overlaps the lateral band 48 of the other of the filter medium bodies 32 in an overlapping region 72. A common circumferential cast element 40 is arranged at a downstream side 21 of the arrangement of the filter medium bodies 12, 32. The lateral bands 27, 48 of the arrangement of filter medium bodies 12, 32 are at least partly embedded in the circumferential cast element 40.

The lateral bands 27, 48 are tightly connected to each other in the overlapping region 72. Preferably the lateral bands 27, 48 may be glued together in the overlapping region 72, e.g., by an adhesive, for stabilizing the arrangement of the filter medium bodies 12, 32, in particular for manufacturing purposes.

The lateral bands 27, 46 may be arranged straight along the side walls of the filter medium bodies 12, 32 on their outer circumference 26, 46. The lateral bands 27, 46 may favorably be extended in the axial direction in order to form the overlapping region 72 for connecting the two filter medium bodies 12, 32. In FIG. 5 the lateral band 27 of the upstream filter medium body 12 is extended alongside of the outer circumference 46 of the downstream filter medium body 32.

Further, as shown with the embodiment in FIG. 5 for the downstream filter medium body 32, the lateral bands 27, 46 may be folded around outer edges 18, 19, 38, 39 of the filter medium bodies 12, 32 for stabilizing the outer edges 18, 19, 38, 39. Thus segments 49 of the lateral bands 27, 46 may be arranged in lateral direction 82 along face sides of the filter medium bodies 12, 32.

The flow direction 90 is marked by an arrow in FIG. 4.

The outermost upstream filter medium body 12 is designed as a particle filter. The outermost downstream filter medium body 32 is designed as an adsorption filter. Upstream side 29 and downstream side 44 are marked in FIG. 5. The fluid enters the filter element 10 from the upstream side 29 and exits the filter element 10 at the downstream side 44.

The filter medium bodies 12, 32 can be formed, for example, as folded filter bellows, and/or as wound bodies, and/or as fill, and/or as coated honeycomb bodies. The particle filter may be formed, for example, from cellulose, and the adsorption filter may be formed, for example, as an activated carbon filter and/or as an ion exchanger. In the embodiment example shown in FIGS. 4 and 5, both filter medium bodies 12, 32 are formed as pleated filter bellows.

The circumferential downstream cast element 40 is arranged at the downstream side 21 of the arrangement of the filter medium bodies 12, 32. The filter medium body 32 arranged outermost downstream in the arrangement of the filter medium bodies 12, 32 is connected to the circumferential cast element 40 at its downstream outer edge 38.

The cast element 40 is configured as a circumferential sealing element for sealing in the axial direction 80 between a raw side 60 and a clean side 62 when the filter element 10 is installed in a filter housing 110 of the filter system 100 as intended. The downstream cast element 40 is arranged radially outside the at least two filter medium bodies 12, 32 and is configured for sealing between the first housing part 112 and the second housing part 114 of the filter housing 110.

A stiffening element 30, in particular a stiffening grid is arranged at the filter medium body 32 arranged outermost downstream in the arrangement of the filter medium bodies 12, 32 on its downstream outer edge 38. The circumference of the stiffening element 30 is embedded in the cast element 40. Favorably, the stiffening element 30 may comprise breakthroughs in its circumference at least in the region of the upstream and/or downstream side 11, 21 of the arrangement of the filter medium bodies 12, 32 for interlocking with the cast element 40. The stiffening element 30 with the cast element 40 is pressed between the sealing surface 126 and the end 128 of the housing wall 118 when being mounted in the filter housing 110.

One or more bolting tabs 58 may be connected to the circumference of the stiffening element 30 as shown in FIG. 5. Thus, the stiffening element 30, which is tightly connected to the filter medium body 32 by embedding in the cast element 40, may serve for fixing the filter element 10 to the filter housing 110, e.g., by bolting tabs and screws.

Further, the outermost downstream filter medium body 32 comprises an additional filter layer 56 arranged on its downstream side 44 for preventing adsorption particles from being discharged from the downstream filter medium body by the fluid flow. Preferred designs for the additional filter layer 56 are filter media based on cellulose and/or synthetic fibers, in particular nonwoven materials, and/or filter membranes.

Figure 6:
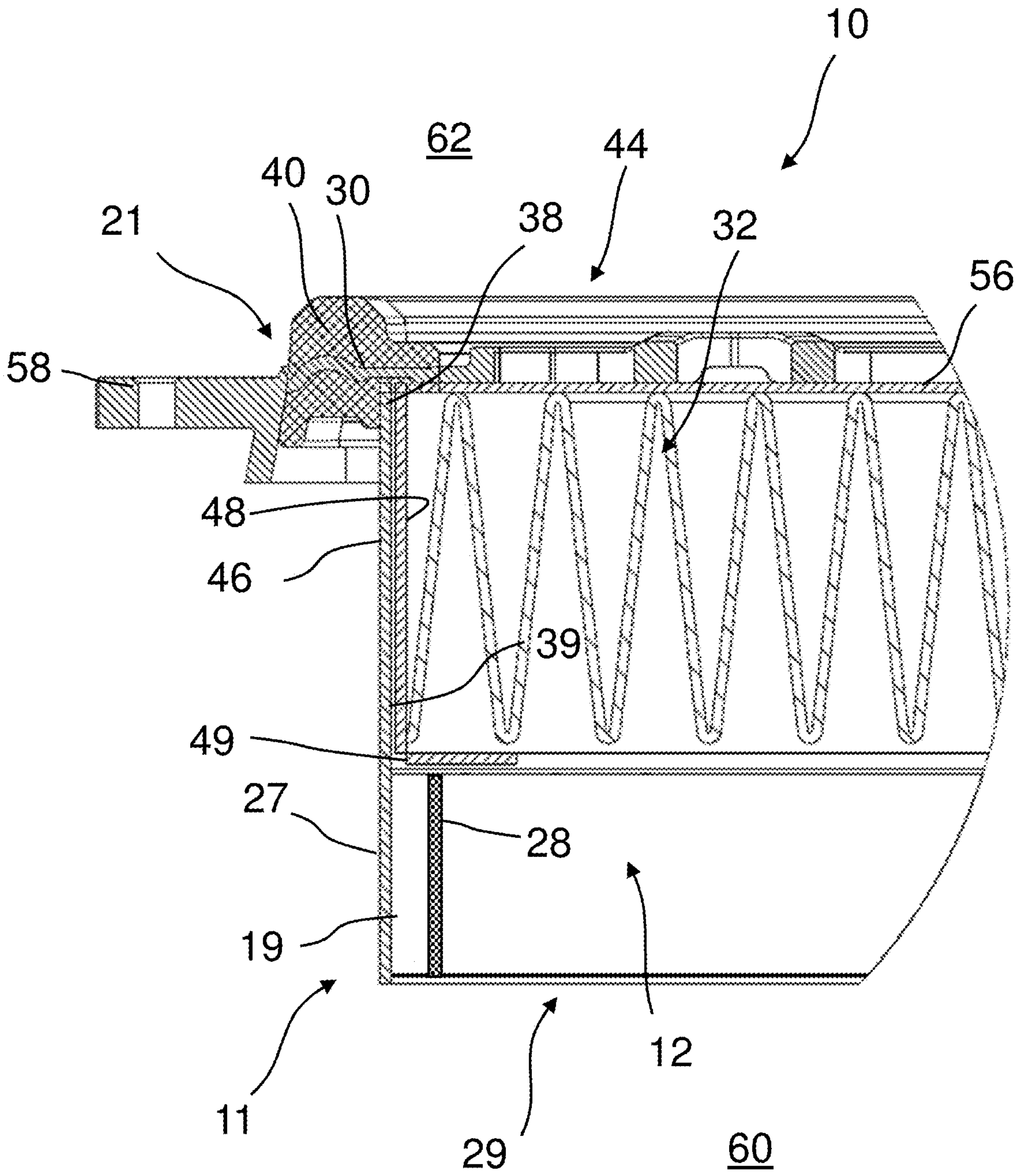
FIG. 6 an enlarged section of a cut view of a filter element according to a further embodiment of the invention.

FIG. 6 depicts an enlarged section of a cut view of a filter element 10 according to a further embodiment of the invention.

Both filter medium bodies 12, 32 are formed as a folded filter bellows. In the embodiment shown, end edges 23 of pleats 22 (FIG. 4) of the upstream filter medium body 12 are sealed with an end edge bonding 28. The individual pleats 22 of the filter medium body 12 are not visible in this illustration, as they run perpendicular to the image plane.

The end edge bonding 28 is at least partially embedded into the upstream cast element 40.

REFERENCE NUMERALS

10 filter element
11 upstream side of arrangement
12 upstream filter medium body
18 downstream outer edge
19 upstream outer edge
21 downstream side of arrangement
22 pleat
23 end edge
26 outer circumference
27 lateral band
28 end edge bonding
29 upstream side
30 stiffening element
32 downstream filter medium body
38 downstream outer edge
39 outer edge
40 cast element
44 downstream side
46 outer circumference
48 lateral band
49 segment
56 filter layer
58 bolting tab
60 raw side
62 clean side
72 overlapping region
80 axial direction
82 lateral direction
90 flow direction
100 filter system
102 fluid inlet
104 fluid outlet
110 filter housing
112 first housing part
114 second housing part
116 housing wall
118 housing wall
120 screw opening
122 screw
124 screw dome
126 sealing area

The invention claimed is:

1. A flat-filter filter element comprising:

an arrangement of at least two flat filter medium bodies being arranged adjacent to each other in an axial direction, so that the fluid can flow through them one after the other in the axial direction, wherein the filter medium bodies each comprise a lateral band at their outer circumference, wherein the lateral band of one of the filter medium bodies protrudes in axial direction over the other one of the filter medium bodies and at least partly overlaps the lateral band of the other of the filter medium bodies in an overlapping region, wherein a common circumferential cast element is arranged at a downstream side of the arrangement of the filter medium bodies, and wherein the lateral bands of the arrangement of filter medium bodies are at least partly embedded in the circumferential cast element in the overlapping region.

2. The filter element according to claim 1, wherein the lateral bands are tightly connected to each other in the overlapping region.

3. The filter element according to claim 1, wherein a stiffening element is arranged at the filter medium body arranged outermost downstream in the arrangement of the filter medium bodies at least on its downstream outer edge, wherein a circumference of the stiffening element is embedded in the cast element.

4. The filter element according to claim 3, wherein one or more bolting tabs are connected to the circumference of the stiffening element.

5. The filter element according to claim 1, wherein the filter medium body arranged outermost downstream in the arrangement of the filter medium bodies is connected to the circumferential cast element at its downstream outer edge.

6. The filter element according to claim 1, wherein the outermost downstream filter medium body comprises an additional filter layer arranged on its downstream side.

7. The filter element according to claim 1, wherein the outermost upstream filter medium body is designed as a particle filter.

8. The filter element according to claim 7, wherein the outermost downstream filter medium body is designed as an adsorption filter.

9. The filter element according to claim 1, wherein the downstream cast element is designed as a circumferential sealing element for sealing between a raw side and a clean side when the filter element is installed in a filter housing.

10. The filter element according to claim 9, wherein the downstream cast element is arranged radially outside the at least two filter medium bodies and is configured for sealing between a first housing part and a second housing part of the filter housing.

11. The filter element according to claim 1, wherein at least one of the two filter medium bodies is formed as a folded filter bellows.

12. The filter element according to claim 1, wherein end edges of pleats of at least one of the two filter medium bodies are sealed with an end edge bonding.

13. A filter system comprising:

a filter housing with a fluid inlet and a fluid outlet, and having at least one flat-filter filter element according to claim 1, the filter element being arranged between the fluid inlet and the fluid outlet, wherein a sealing surface of a first housing part of the filter housing abuts a downstream cast element of the flat-filter filter element arranged at the downstream filter medium body, and wherein a housing wall of a second housing part of the filter housing is sealingly pressed against the cast element on an opposite side of the sealing surface.

14. The filter system according to claim 13, wherein a stiffening element is arranged at the filter medium body arranged outermost downstream in the arrangement of the filter medium bodies at least on its downstream outer edge, wherein a circumference of the stiffening element is embedded in the cast element, wherein the stiffening element with the cast element is pressed between the sealing surface and the end of the housing wall.

15. The filter system according to claim 14, wherein one or more bolting tabs are connected to the circumference of the stiffening element.

* * * * *